United States Patent [19]
Knox et al.

[11] Patent Number: 5,694,154
[45] Date of Patent: Dec. 2, 1997

[54] TOUCH SENSOR INPUT SYSTEM FOR A COMPUTER DISPLAY

[75] Inventors: Andrew Knox, Kilbirnie; John S. Beeteson, Ayrshire, both of Scotland

[73] Assignee: International Business Machines Corporation, Armonk, N.Y.

[21] Appl. No.: 513,246

[22] Filed: Aug. 10, 1995

[30] Foreign Application Priority Data

Nov. 8, 1994 [GB] United Kingdom .................. 9422525

[51] Int. Cl.$^6$ .................................................. G09G 5/00
[52] U.S. Cl. ................................................................ 345/173
[58] Field of Search ............................. 340/711, 712; 178/18–19, 20; 345/173–174, 179

[56] References Cited

U.S. PATENT DOCUMENTS

| | | | |
|---|---|---|---|
| 4,293,734 | 10/1981 | Pepper, Jr. | 178/18 |
| 4,374,381 | 2/1983 | Ng et al. | 345/173 |
| 4,698,460 | 10/1987 | Krein | 178/19 |
| 4,771,276 | 9/1988 | Parks | 345/173 |
| 5,053,757 | 10/1991 | Meadows | 345/173 |
| 5,159,159 | 10/1992 | Asher | 178/18 |

Primary Examiner—Richard Hjerpe
Assistant Examiner—David L. Lewis
Attorney, Agent, or Firm—Martin J. McKinley

[57] ABSTRACT

A conductive coating on the front surface of the display screen is used to determine the position of an object, such as a user's finger, touching the screen. Sensors at the edge of the conductive coating detect changes in the level of the ambient field pickup when the user's finger touches the display screen. The conductive coating may optionally be divided into blocks with separate connections to each block, or may have a resistivity profile so as to allow full X and Y co-ordinate determination of the position of the finger. Also, optionally, a stylus generating an electromagnetic field when in contact with the display may be used in place of the finger.

2 Claims, 7 Drawing Sheets

TOUCH SENSOR INPUT SYSTEM FOR A COMPUTER DISPLAY

BACKGROUND OF THE INVENTION

Applicants claim the foreign priority benefits under 35 U.S.C. 119 of U.K. Application No. 9422525.7 filed Nov. 8, 1994.

The present invention relates to cathode ray tube (CRT) displays having touch sensor inputs and, more particularly, to those which have a coating, for example, to reduce electro-static fields.

Prior art systems to provide for operator input into a CRT display by having an arrangement which is sensitive to an operator positioning a stylus or a finger on the front face of the display screen are well known.

An early example of such a system is the light pen. A light sensitive device, incorporated into the end of a pen, detects the light generated by the CRT as it sweeps past the pen. The pen position on the screen is calculated by latching the screen memory co-ordinates being accessed when the light is detected. A flying lead coupling is needed from the pen to the display.

To overcome this tethering requirement, touch sensitive technologies have been developed to allow the contact of an object or of an operators finger to be detected. These technologies include infra-red, acoustic wave and pressure sense, capacitive and resistive.

Infra-red and acoustic wave technologies use multiple beams of either infra-red light or surface acoustic waves and detect the presence of an object or a finger by interference with the light beam or the acoustic wave. These technologies are relatively expensive and are subject to ambient signal interference.

Pressure sense technology utilizes pressure sensors at the four corners of a glass panel suspended in front of the display, or at the four corners of the CRT itself. This technology is also expensive and can buffer from mechanical interference.

Capacitive and resistive technologies involve overlays in front of the display screen itself. In capacitive technologies, the grounding effect on AC voltages injected into the overlay is measured. In resistive technologies, the change in resistance between two layers caused by pressure from a finger is measured. The overlays can reduce the sharpness of focus or the brilliance of the CRT display screen as well as adding to the cost of the system.

U.S. Pat. No. 4,281,323 discloses a touch sensing display which uses ambient electrical noise generated by the operating display. Conductive strips are arranged in rows and columns across the face of the display. In operation, electrical noise is generated in the strips. When the operators finger comes into contact with a pair of the strips (a row and a column), the amplitude of noise on these strips changes. This change can be sensed to provide an indication of the position of the touch. Since there are lines and pads on the front of the screen, the sharpness of focus or the brilliance of the CRT display screen is reduced as well as adding to the cost of the system.

U.S. Pat. No. 4,771,276 attempts to overcome these problems by placing the strips along the side edges of the CRT faceplate and processing the signals from these strips so as to provide output signals indicating the coordinate location of an object touching or immediately adjacent to the faceplate which differentially alters the pattern of electromagnetic signals. Such a system involves complex processing of the signals in order to obtain positional information and may be susceptible to ambient electrical noise, although filtering can be used to reduce this sensitivity, but at the penalty of additional cost.

In operation, standard CRT's build up a static charge on their screen. This attracts dust and can give a user a static shock when the screen is touched. Many monitors today have a high resistance electrostatic free (ESF) coating over the front of the screen, which is grounded. Technologies used to apply this coating include vacuum coat, silica spray, double spray, spin coat and vapor coat. Vacuum coat uses vacuum evaporation to produce a conductive coating have a resistivity in the $K\Omega/\square$ level. Silica spray uses a sprayed layer of silicon dioxide particles with added conductive particles to produce a conductive coating have a resistivity in the region of $10^9\Omega/\square$. Double spray uses a first conductive sprayed layer, followed by a second insulating silicon dioxide sprayed layer to produce a resistivity of around $10^7\Omega/\square$. In spin coat, the second insulating silicon dioxide layer is spun on to produce a resistivity of between $10^7\Omega/\square$ and $10^9\Omega/\square$. Vapor coat uses hot tin oxide vapor to coat the front surface of the CRT. This may be followed by a sprayed silicon dioxide coating. The coating resistivity may vary from a few $K\Omega/\square$ to $10^7\Omega/\square$.

So it would be advantageous to provide a touch screen system, which provided positional information with little or no susceptibility to ambient interference, with simple processing of signals and which did not unduly degrade the sharpness of focus or the brilliance of the CRT display.

SUMMARY OF THE INVENTION

Briefly, the invention provides a computer display having touch sensor input. The display includes a display screen for the display of information to a user, wherein the screen has a conductive coating on its front surface. The resistivity of the conductive coating is, preferably, below $10^7\Omega/\square$. Sensors are included for the detection of the ambient field picked up by the conductive coating, wherein a change in the level of the ambient field picked up by the conductive coating is used to indicate contact with the display screen by an object. Preferably, the conductive coating is of the type that is already used in some CRT-displays for the reduction of electro-static field. The ambient field is, preferably, that of the EHT supply to the CRT, the stray electromagnetic field from the deflection yoke, or the stray mains field for non-CRT displays. The change in level of ambient field may be that caused by the finger of a user contacting the screen, but may also be due to a stylus which generates or disturbs an electromagnetic field on contact with the conductive coating.

In a first embodiment, the conductive coating is split into a plurality of blocks and inlcudes a plurality of sensors, one for each block. A processing circuit senses the changes in ambient field level detected by each of the sensors. In order to assist in screening the sensors, they are preferably positioned under a conductive band located around the rim of the CRT. Preferably, the processing circuit does not indicate contact with the display screen when a corresponding change in level is sensed for substantially all of the blocks, since this is likely due to a change in the displayed image, rather than due to an object making contact with the display screen.

In a second embodiment, the coating is continuous over the screen, the resistivity of the coating varies from a high level at the screen center to a lower level near the four edges of the screen and a sensor is located on each of the four edges of the display screen. This allows changes in the position of the object touching the screen to be sensed accurately. Positioning four additional sensors on the side of a conductive band located around the rim of the CRT, which is distal from the display screen, allows these sensors to be used for noise reduction. Preferably, the levels from sensors on opposing sides of the display screen are combined in such a way as to detect the ratio of the two levels.

BRIEF DESCRIPTION OF THE DRAWING FIGURES

DESCRIPTION OF THE ILLUSTRATIVE EMBODIMENTS

In a CRT display, electromagnetic noise is generated by the field created by the Extra High Tension (EHT) supply to the anode. This radiation is at a frequency equal to the ripple frequency of the EHT supply. This supply is either generated from the horizontal flyback circuit in the display, or from a separate generation circuit which is usually synchronized either to the horizontal scan frequency or to a multiple of it. In either case, the frequency involved will range from a few tens of Hertz to a few tens of Kilohertz.

This electromagnetic noise can be sensed by a sensor, such as a conductive coating on the front of the screen. A coating of lower surface resistivity is required, the vapor coat mentioned above being an example of such a coating. When a finger or other object contacts the screen, this noise level is changed. The change is sensed and is used to generate signals indicating the position of the object which has contacted the screen. It is necessary that only a definite touch is detected, and not a finger or object merely moving close to the surface. Advantageously, it has been found that detector sensitivity is similar to that of FIG. 5 for the vapor coat process, where significant signal change is not seen until the finger is within a few tens of micrometers from the surface.

Figure 1:
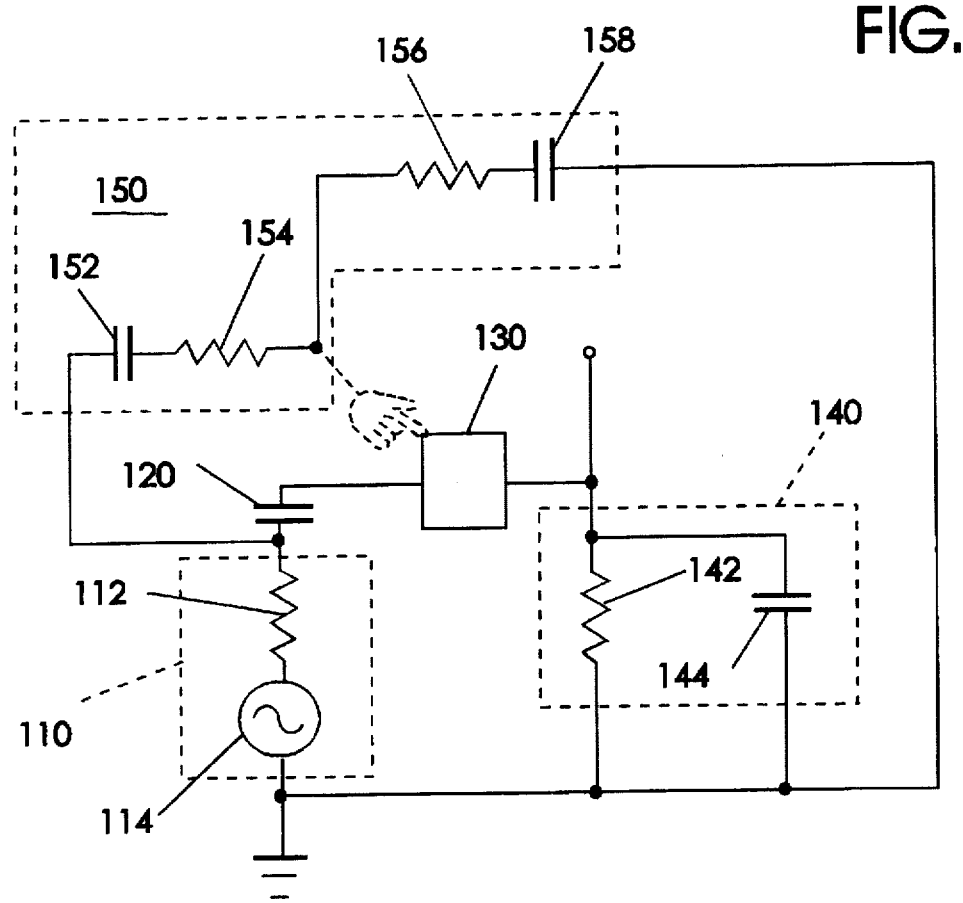
FIG. 1 is a equivalent circuit of the sensor and pickup path of the system of a first embodiment of the present invention.

The system is modeled by the equivalent circuit shown in FIG. 1. The EHT supply source 110 comprises a voltage source 114 having a significant internal resistance 112. For the purposes of the equivalent circuit and of FIG. 1, voltage source 114 represents only the variations causing electromagnetic noise. The voltage source itself also has a DC component of around 25 KV to cause correct operation of the CRT. Such variations in the voltage source 114 are coupled through the capacitance 120 between the shadow mask inside the glass envelope of the CRT and the ESF coating used to reduce the static charge on the front of the screen. The ESF coating forms the second plate of the capacitance. That second plate may be contacted by a user 150 touching an area of the coating (pad) 130 on the front surface of the display screen. An electrical connection is made to that second plate to detect the level of variations in the voltage source 114.

In order to perform its function, the ESF coating must be connected to a ground point to bleed away the static charge. Resistance 142, which is formed of the conductive tape used to connect the T-band of the CRT to the ESF coating itself serves this purpose. The T-band of the CRT surrounds the glass envelope of the CRT and is also connected to the mounting lugs of the CRT. It is through this path that the ESF coating is connected to ground. If the coating were solidly grounded by this band, then a sensor placed close to this point would be expected to have a severely attenuated response. In practice, the conductive tape makes the actual connection between the T-band and the ESF coating itself. The resistivity of this tape, although adequate for ESF purposes, is actually quite high, typically around $10^8 \Omega/\square$.

Also shown in the equivalent circuit is the screen capacitance 144, which is the capacitance that the ESF coating itself has to ground. The sensor voltage that is processed by the circuits of FIG. 2 is that picked up by the pad 130, as affected by the resistance 142 and the screen capacitance 144.

The equivalent circuit 150 of the finger of a user of the display has a capacitance 158 and resistance 156 to ground. It also has a capacitance 152 and resistance 154 to the EHT supply source 110. When the finger of the user is brought into contact with the pad 130 on the front surface of the display screen, the sensor voltage is modified by the additional pickup caused by capacitance 152 and by the additional capacitance 158 to ground.

Figure 2:
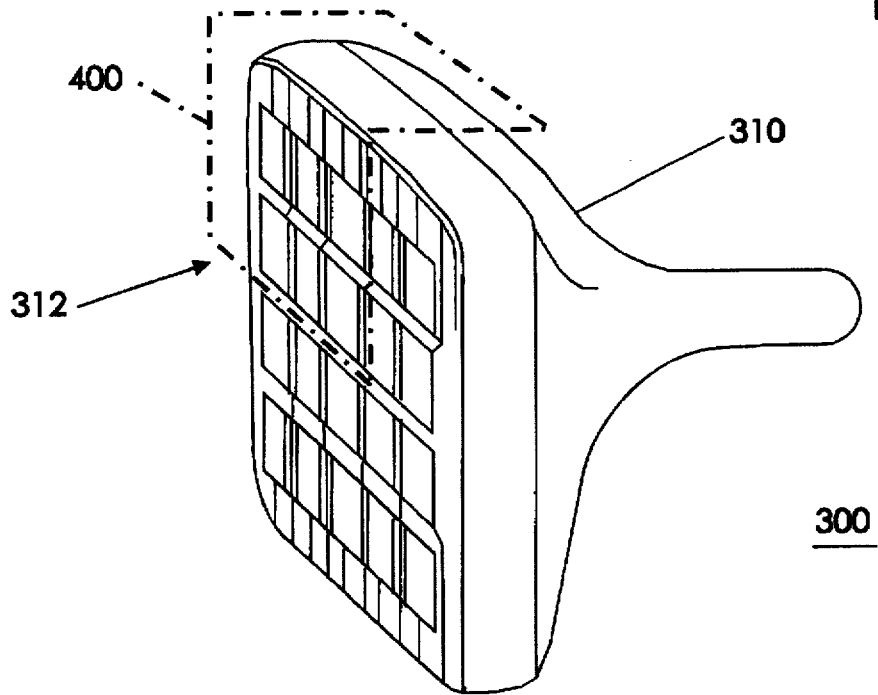
FIG. 2 is a schematic diagram of the front face of a CRT incorporating the blocks of a first embodiment of the present invention.
Figure 3:
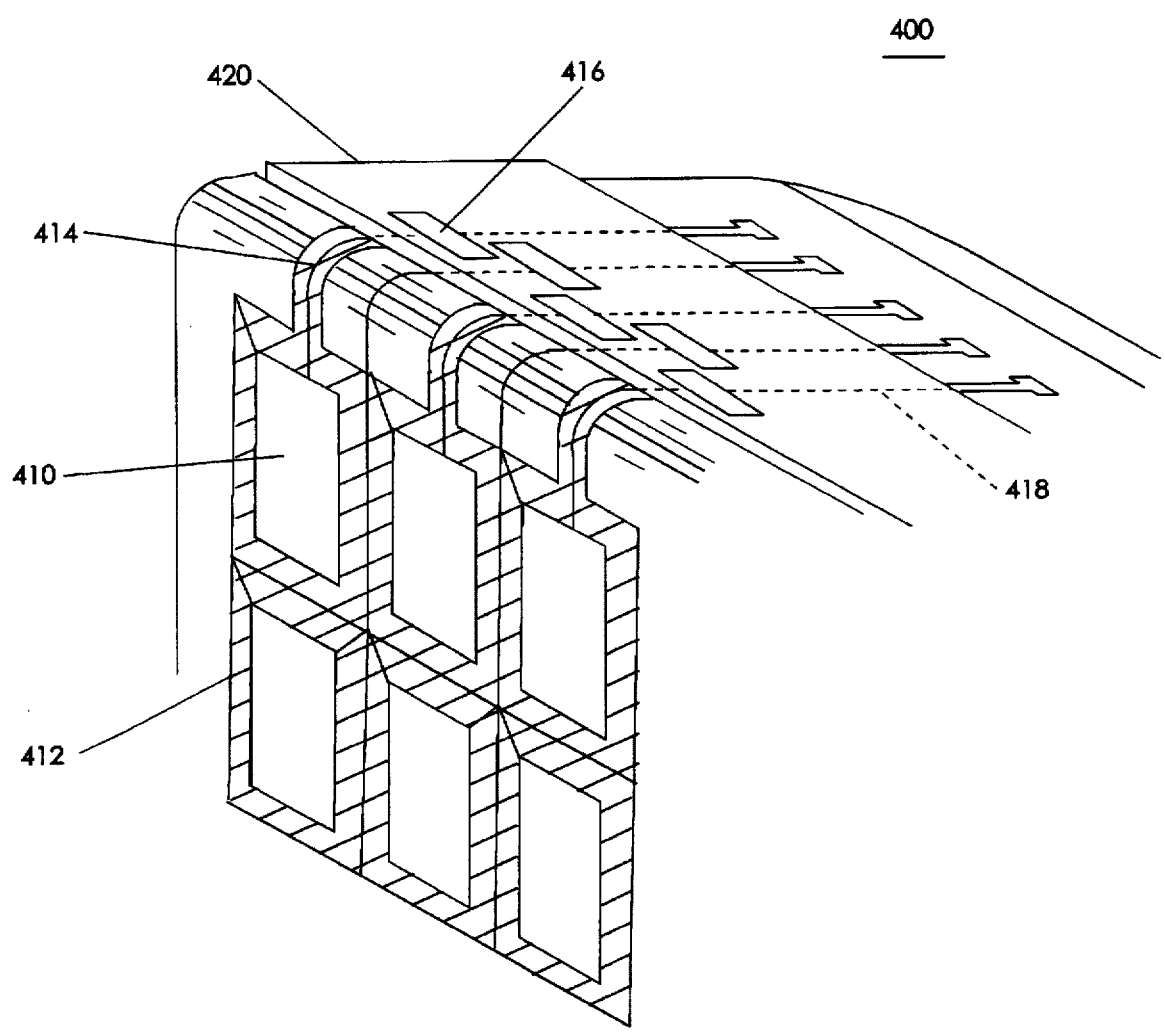
FIG. 3 is an enlarged portion of the area outlined in FIG. 2.

FIG. 2 shows a CRT 300 having a glass envelope 310 with a faceplate 312. FIG. 3 shows detail of the area 400 of the faceplate 312 in FIG. 2. In FIG. 3, the blocks 410 of ESF coating are shown, separated by isolating regions 412 from the surrounding area of ESF coating, and from the surrounding blocks, each block 410 being connected to the T band through a separate resistive path 142 (FIG. 1). Each block 410 has its own capacitance 144 (FIG. 1) to the screen. A conductive track 414 made from the same material as the ESF coating is used to provide a connection to the edge of the CRT. At the edge of the CRT, DAG or similar material is painted onto the ESF material to form a sensor pad 416. A conduction track made of DAG material is then used to provide a circuit connection to the circuitry of FIG. 4.

The sensor pads may be placed under the T-band, where they operate satisfactorily and are shielded from ambient noise. It may be possible, in some circumstances, to replace the sensor pads 416 by a simple connection to the ESF coating.

Because the blocks 410 of ESF coating on the front surface of the display screen are fixed, the screen image must be set up to match the blocks 410, and the software generating the screen image and accepting the responses must ensure that illuminated push points have sufficient tolerance between them to cope with picture movements and finger pointing tolerance. The embodiment chosen has 20 blocks in total, arranged as a matrix of 5 by 4 blocks. Each block 410 is 40 mm square, with the isolating regions 412 being 10 mm wide. Software created illuminated push points which are 20 mm square are then used.

Figure 4:
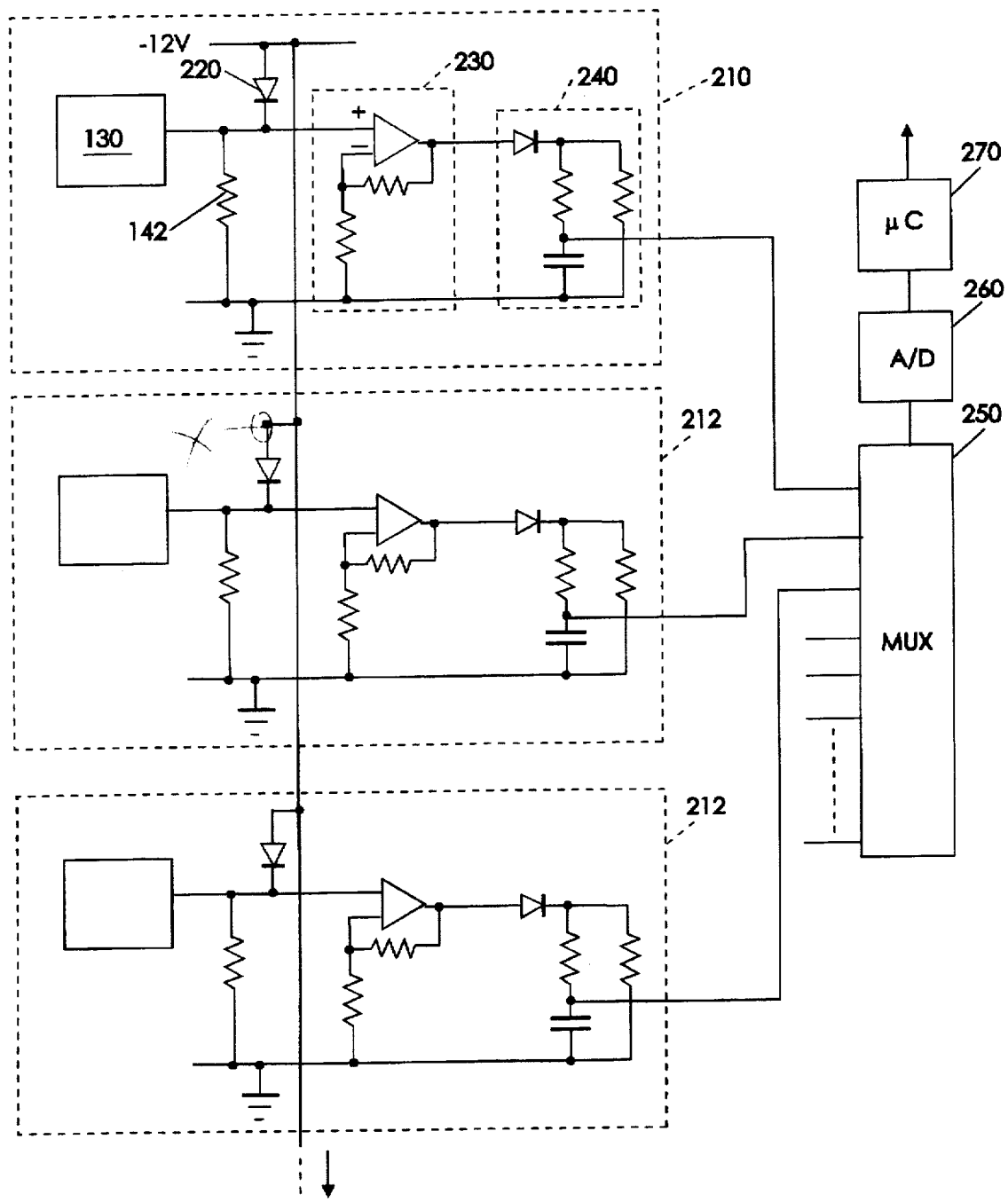
FIG. 4 is a schematic diagram of the sensor processing circuitry of the system of a first embodiment of the present invention.

FIG. 4 shows the processing circuitry that receives the signals from the pad 130 and provides an output indicating that contact has been made by an object with a pad, that contact has been broken with a pad, and with which pad this has occurred. AC variations of each block on the screen are converted to a DC level and passed through a multiplexer 250, an Analog to Digital (A/D) converter 260, and then processed by a microcontroller 270, which provides the outputs.

Pad 130 is connected to ground by resistance 142, so that it performs its ESF function. Flashover diode 220 provides protection for the electronic circuits in the event of CRT arcing occurring during turn on or turn off when the EHT is varying rapidly. Buffer and gain circuit 230 provides the signal to detector circuit 240. The detector circuit has a filter time constant of three times the frame time of the display, that is around 42 mS. The output from the detector circuit goes via a multiplexer 250 to the A/D converter 260. The microcontroller 270 controls the multiplexer and requests conversion of the detected DC levels from each pad 130 in turn. The result is stored as an 8 bit integer. Each conversion performed by the A/D converter takes 100 μS, but will be interrupt-driven so that the microcontroller will be able to continue other tasks during the conversion. Since there are 20 blocks, the conversions will take about 2 mS to perform. However, in the chosen embodiment, the conversions are completed once every display frame, that is about once every 14 mS. The filter time constants, frame periods and conversion times may be varied from the example given without affecting the operation of the invention.

The microcontroller 270 keeps a running store of the last three conversions (the filter time constant of the detector is equal to three frame periods) for each of the pads 130. After each new conversion, the new value is checked against the value three frames earlier to determine if a change has occurred in the value. If a change has occurred, then the values for all of the pads 130 are checked against those for the corresponding pads three frames earlier. If all (or most) of the values have changed, then it is the image on the display screen that is changing, and no touch on the pad 130 will be recorded. If only one block has changed in value, then a touch on the pad 130 will be recorded, and the pad number reported back to the system unit attached to the display. If the change is in a positive direction, then a finger or other object touching the screen will be recorded, if in a negative direction, then a finger or other object being removed from the screen will be recorded. Multiple touches (analogous to "double-click"s from a pointing device) can be detected and reported, as for example, those used in some applications to confirm selection of an icon displayed on the display screen. If the A/D converter resolution is inadequate to resolve changes relative to the standing noise level, then a noise reduction circuit can be added by sensors remote from the T band, in a similar way to that which will be described in a second embodiment.

The changes required to the conventional hot vapor (or hot vapor plus silica coat) ESF process are the prior application of the mask defining the block 410 areas and the isolating regions 412 and the addition of the painted connections to the edges of the faceplate. The resistivity of the ESF coating needs to be controlled such that the conductave tracks going to the edge of the faceplate, which are about 5 mm wide, have an adequately low resistance. The ESF coating needs to be sufficiently homogeneous, that is without microcracks, after passing through all of the CRT manufacturing processes. The microcontroller can be that used for other purposes in the display. As can be seen above, the required processing algorithms are simple.

Since the majority of CRT touch applications are simple menu selections, the lack of full X/Y co-ordinate sensing is acceptable given the simplicity and ultra low cost of the system.

A second embodiment of the invention uses an ESF conductive coating which has a controlled resistivity profile. In this way full X/Y coordinate sensing is available for those touch applications for which it is necessary or desirable. Such a system is however, more costly and complex.

In the second embodiment, either the stray mains fields of 50 Hz or 60 Hz frequency or a stylus producing a 250 Hz field is detected by the ESF Coating. Stray mains fields are present from the display, the fields being coupled into the human body, or from stray mains fields generated from other equipment. The ESF coating used is a continuous one, not split up into blocks. Using stray mains fields or a stylus rather than those generated by the EHT circuits means that the technique is also useable for flat panel displays such as LCDs, FEDs, plasma and the like.

Shielding of the sensors from ambient noise is required. This can be achieved by placing the sensors under the conductive tape of the T-band with DAG conductors brought outside the T-band for connection to the electronics. Grounding the display itself through the mains safety ground where available also assists in reducing the ambient noise, although this is not essential.

Figure 5:
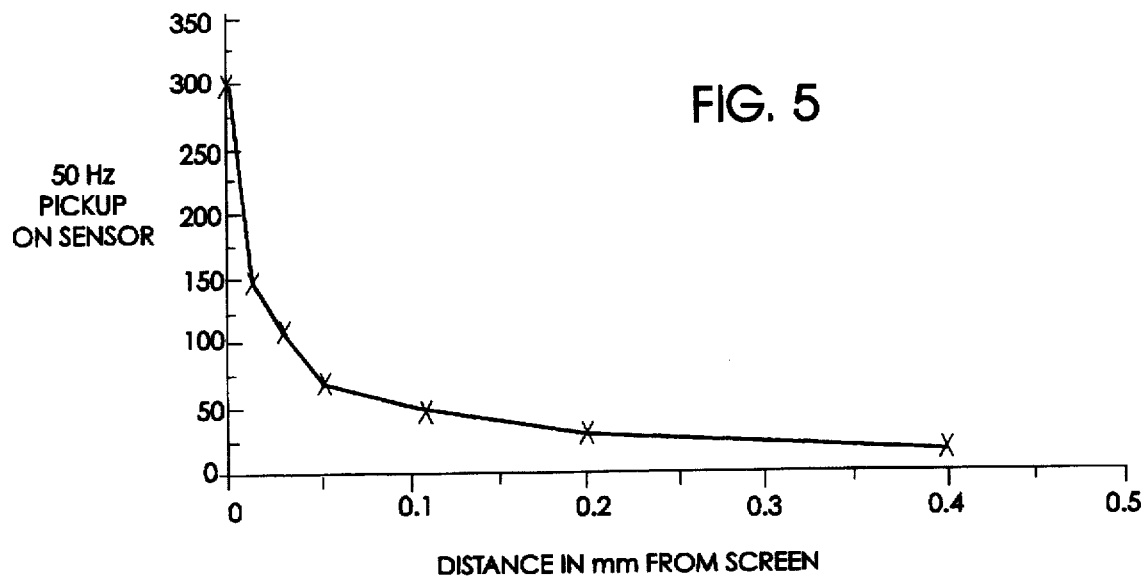
FIG. 5 is a graph of electro-magnetic pickup voltage versus distance, the effect being used in both embodiments of the invention.

A background stray mains field is always present at a low level. This only increases slightly when a finger is brought close to the screen, at a few thousands of an inch (0.075 mm) away there is only a small increase in this background. When the finger actually touches the screen, the level increases by one order of magnitude. FIG. 5 shows a graph of distance of a finger from the screen versus the level of 50 Hz pickup. The sharp knee in the curve as the finger touches the screen can be seen.

Figure 6:
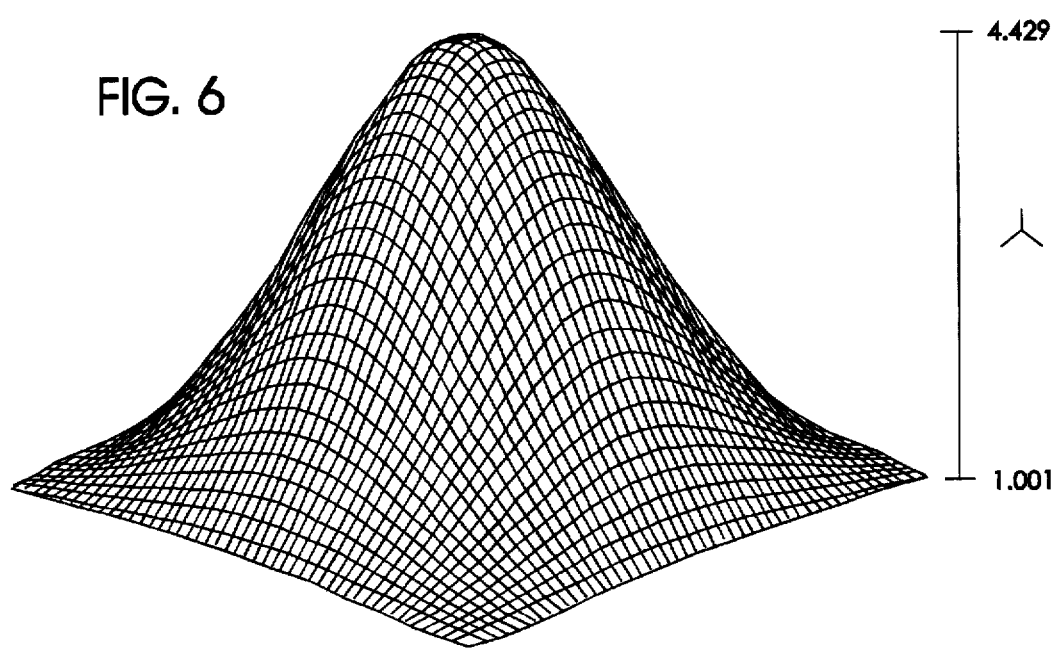
FIG. 6 is a surface graph of the desired resistivity profile of the coating for use in the second embodiment of the invention.

To achieve full X/Y co-ordinate sensing, the resistivity of the ESF coating can be varied across the screen so that the sensor output continuously varies with distance. The outputs of sensors at each side of the screen can be ratio-ed and the position of the touch deduced. FIG. 6 shows such a resistivity profile which achieves the sensor output variation with position. The resistivity at screen center is high, gradually reducing to a low resistivity at the screen edges. Such a profile is achieved by varying the ESF process from that normally used in order to obtain controlled varying resistivity with position on the screen.

Figure 7:
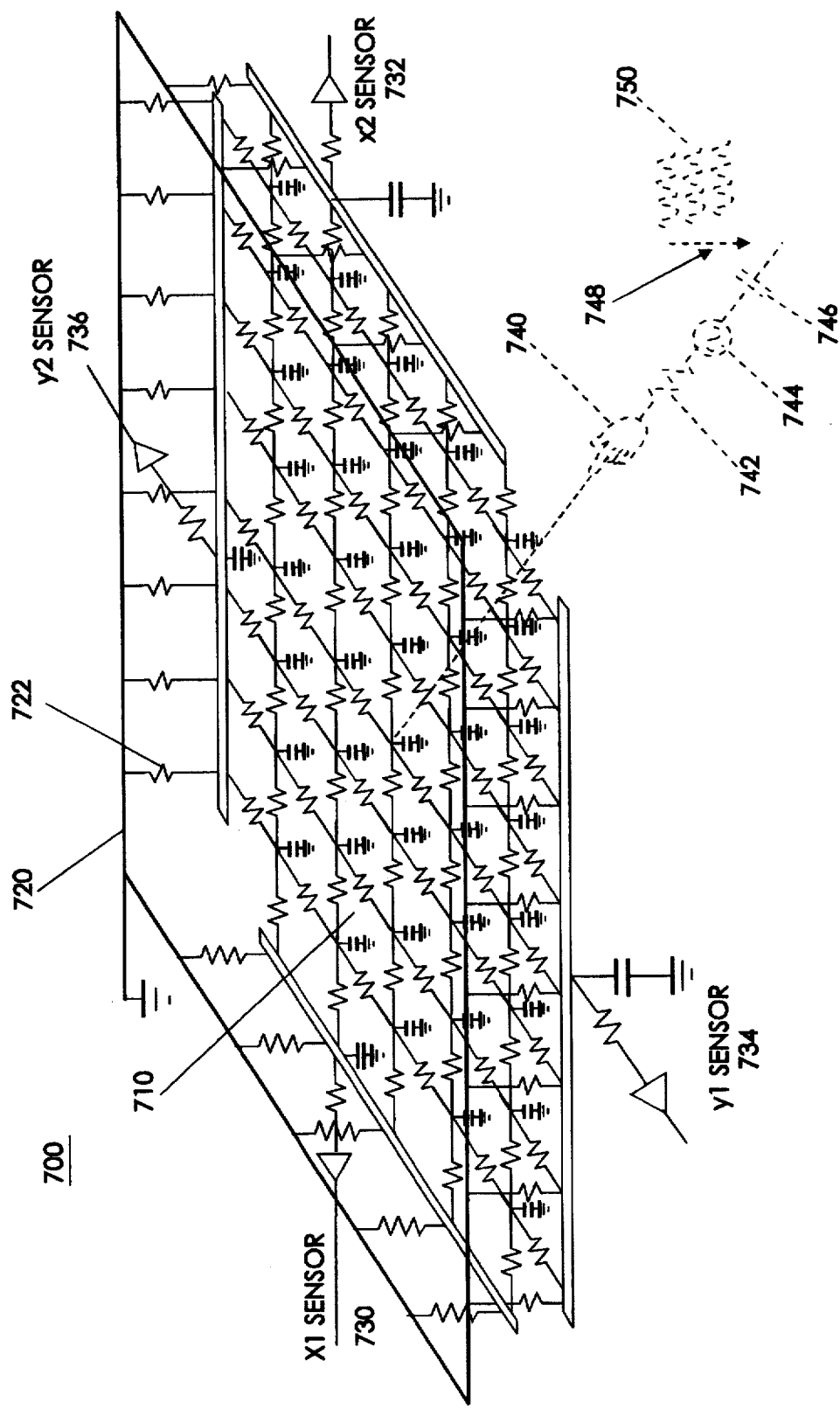
FIG. 7 is a schematic diagram of the sensor and pickup path of the system of the second embodiment of the present invention.

A computer simulation of the resistivity profile of FIG. 6 has been modeled. The surface having varying resistivity was modelled by the equivalent circuit of FIG. 7. The resistive ESF coating 710 is represented by resistors which are of value 250MΩ at the center of the screen, decreasing to value 20MΩ at the periphery. The resistors are arranged in a matrix of 10×8 resistors. The grounded T-band 720 is connected via conductive tape 722, also represented by resistors of value 4400MΩ to the ESF screen 710. Sensors 730, 732, 734 & 736 detect the increase in field pickup caused by the finger (represented by 740) touching the screen. Capacitors simulate the four sensors X1, X2, Y1 &

Y2 and 10MΩ resistors are used to represent the load output. The ambient field 750 is picked up by the body acting as an antenna 748 and coupling the field through a 2KΩ resistor 742 and a 100 pF capacitor 746 to the finger 740.

Figure 8:
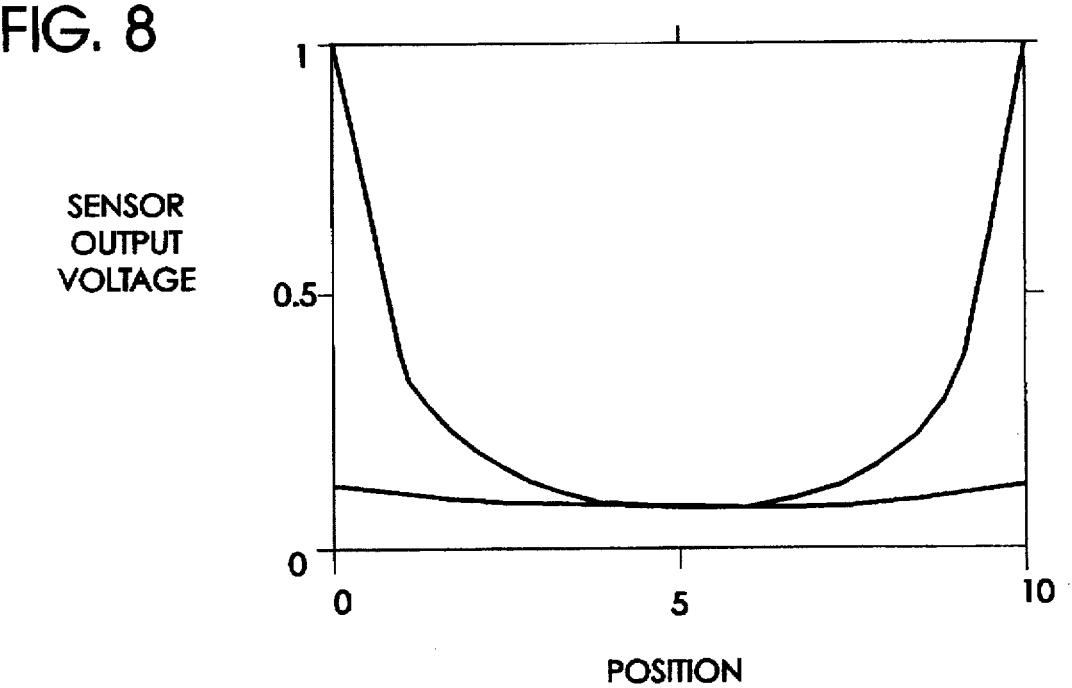
FIG. 8 is a graph of the sensor output voltages versus position of the sensors of FIG. 7.

The finger was connected to each node in the matrix in turn to obtain a series of sensor output readings across the CRT or LCD display face. FIG. 8 shows the outputs obtained from the left sensor and the right sensor as the finger input is connected to successive nodes across the center line of the display. In the diagram, the left hand end of the x-axis represents the left hand edge of the display screen, the right hand end, the right hand edge.

Since the exact amplitude of the induced signals is not known, it is necessary to divide the left hand sensor reading by the right hand sensor reading. Since the amplitude factor is common to all sensors, taking the ratio normalizes the numbers to be used to deduce where the finger has touched the screen. By obtaining ratios for the x1 and x2 sensors, and for the y1 and y2 sensors, the position in x and y coordinates can be determined by, for example, looking up the values in a table, which has been predetermined from the surface resistivity profile. Initial calibration may be used at a discrete number of points, with interpolation between those discrete points based on the resistivity profile.

Figure 9:
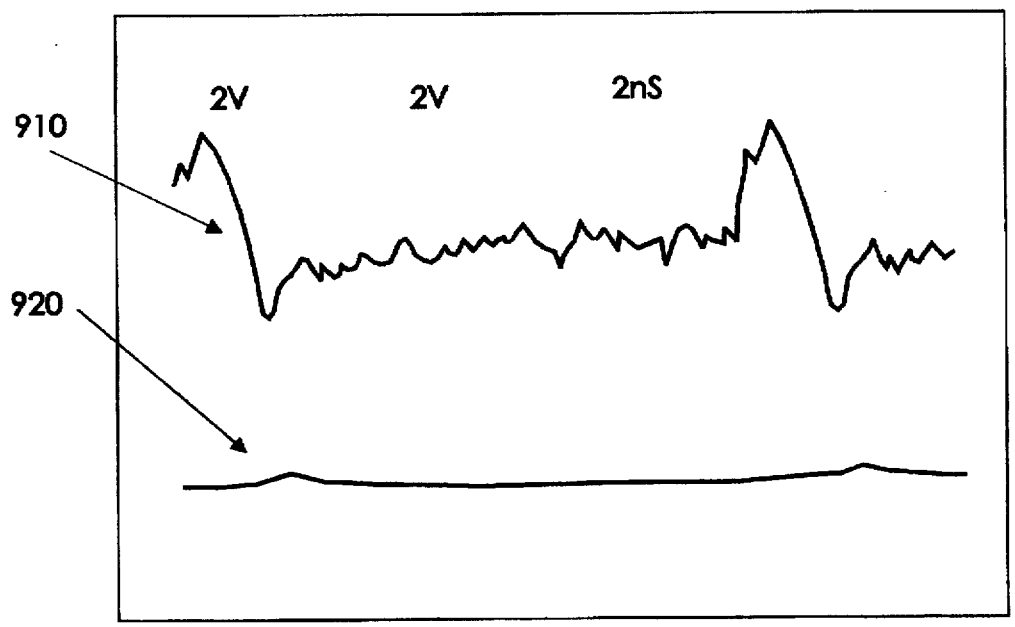
FIG. 9 is a graph of the sensor output voltage versus time of the sensors of FIG. 7.
Figure 10:
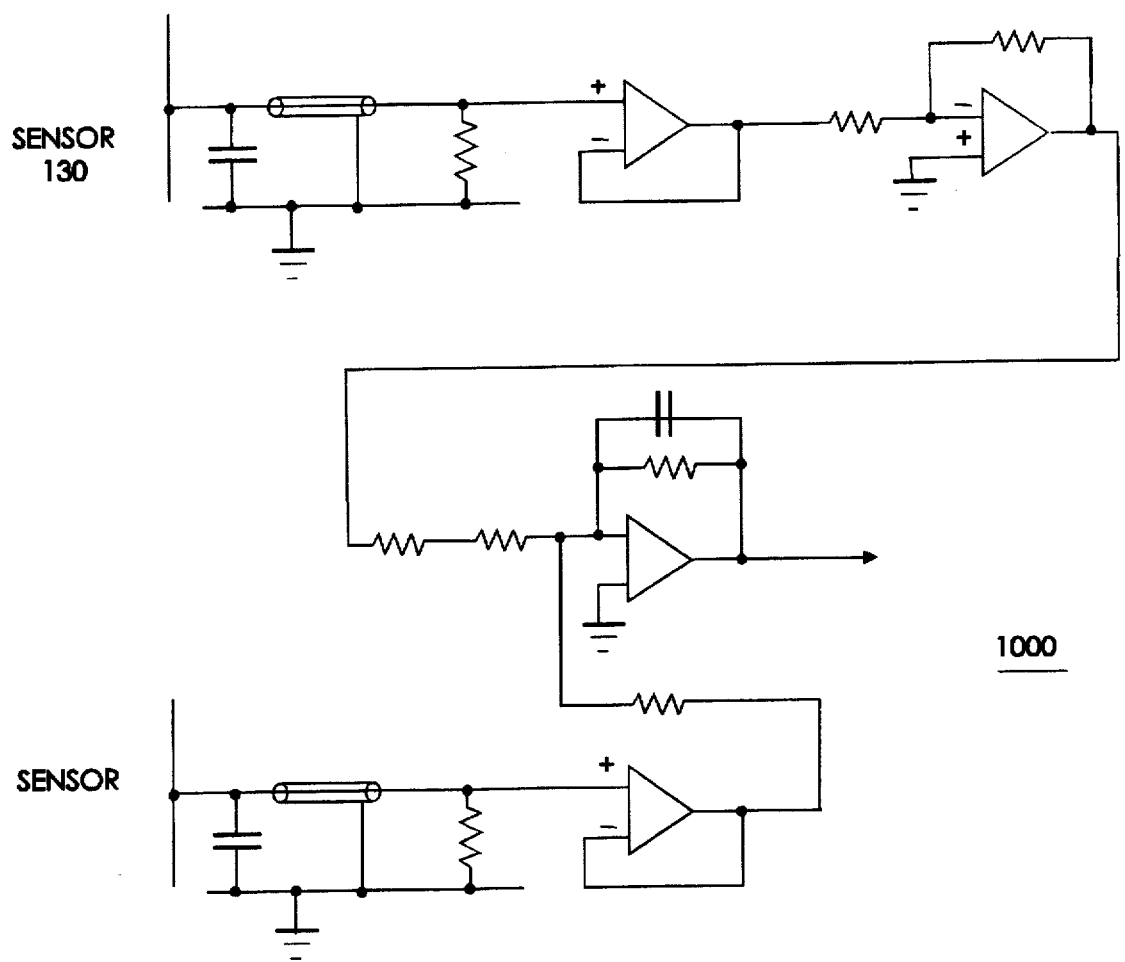
FIG. 10 is a schematic diagram of a noise reduction circuit used in the second embodiment of the invention.

When used on a flat panel display, the sensors may be simple conductive strips to capacitively pick up x and y signals. A grounded screen may be used to avoid stray ambient noise. For CRT displays further precautions are used in order to reduce the noise induced into the sensors by the electrical variations of the display scan and video signals. In FIG. 9, line 910 shows a typical sensor output with a graphics window image displayed (the large positive pulses are vertical retrace). The large positive pulses are many times higher than the finger or stylus induced signals which it is desired to detect. In order to reduce this noise to a point where simple filtering can be used to extract the induced signal, a second sensor for each side of the CRT is placed on the glass to pick up the same scan and video signals. The sensor is positioned on the glass near to the T-band on the side opposite from the faceplate. The T-band, being grounded, acts as a barrier to the induced signals. In this way the two sensors provide almost identical signals, one with and one without the pickup. Using the circuit of FIG. 10, these are buffered, subtracted and high frequency filtered, and the noise reduced to the level shown in FIG. 9 as line 920. The matching network of input cable capacitance, the capacitor and the resistor used at the input should be optimized for good noise cancellation. Such noise cancellation optimization is known to those skilled in the art, but it is expected that the capacitance value would be about 10 pF, and the resistance value about 10MΩ.

In a variation of the second embodiment, a stylus is used as a source of a 250 Hz signal, with a conductive tip to contact the screen. The stylus does not contain any electrical wiring to the screen, but may be used with a mechanical tether for security. The stylus is battery operated with CMOS circuits for low power and long battery life. The tip may contain a switch to automatically turn on the stylus when it contacts the screen.

We claim as our invention:

1. A touch screen display system, comprising:

a display screen including a cathode ray tube (CRT);

an extra high tension (EHT) generator;

a plurality of conductive pads on said display screen, each of said conductive pads being separated by an isolating region;

a plurality of sensors for detecting an ambient field generated by said EHT generator and picked up by said conductive pads;

a processor circuit for detecting a change in the ambient field when one of said conductive pads is contacted by an object;

a conductive band around said CRT; and a high resistivity material coupled between said band and said conductive pads, such that any static charge that builds up on said pads is discharged through said high resistivity material.

2. The display system of claim 1, wherein said sensors are positioned under said conductive band.

* * * * *